United States Patent [19]
Gamble

[11] Patent Number: 5,949,070
[45] Date of Patent: Sep. 7, 1999

[54] SCANNING FORCE MICROSCOPE WITH INTEGRAL LASER-SCANNER-CANTILEVER AND INDEPENDENT STATIONARY DETECTOR

[76] Inventor: Ronald C. Gamble, 3390 Ellington Villa, Altadena, Calif. 91001

[21] Appl. No.: 08/783,416

[22] Filed: Jan. 14, 1997

Related U.S. Application Data

[63] Continuation-in-part of application No. 08/516,771, Aug. 18, 1995, abandoned.

[51] Int. Cl.[6] .................................................. H01J 37/352
[52] U.S. Cl. ............................................................ 250/306
[58] Field of Search .................................. 250/306, 307, 250/234

[56] References Cited

U.S. PATENT DOCUMENTS

| | | | |
|---|---|---|---|
| 5,291,775 | 3/1994 | Gamble et al. | 73/105 |
| 5,294,804 | 3/1994 | Kajimura | 250/306 |
| 5,298,975 | 3/1994 | Khoury et al. | 250/306 |
| 5,319,960 | 6/1994 | Gamble et al. | 73/105 |
| 5,406,832 | 4/1995 | Gamble et al. | 250/306 |
| 5,406,833 | 4/1995 | Yamamoto | 73/105 |
| 5,408,094 | 4/1995 | Kajimura | 250/306 |
| 5,440,920 | 8/1995 | Jung et al. | 250/306 |
| 5,467,642 | 11/1995 | Hosaka et al. | 250/306 |
| 5,616,916 | 4/1997 | Handa | 250/306 |
| 5,621,210 | 4/1997 | Lindsay | 250/306 |
| 5,656,769 | 8/1997 | Nakano et al. | 250/306 |
| 5,750,989 | 5/1998 | Lindsay | 250/306 |

*Primary Examiner*—Bruce C. Anderson
*Attorney, Agent, or Firm*—McCutchen, Doyle, Brown & Enersen, LLP; Michael J. Shuster

[57] ABSTRACT

A scanning force microscope is disclosed which includes integrated optics for viewing the optical lever arm, probe and sample to be examined. The scanning force microscope includes a simplified mounting of laser and related adjustments and the locating of a detector independent of the scanner, to improve ease of handling and providing convenient locations for adjustments. In one preferred embodiment of the scanning force microscope, the surface of samples may be imaged while the cantilever portion of the scanner is immersed in liquids without special set-up or special adapters.

15 Claims, 6 Drawing Sheets

SCANNING FORCE MICROSCOPE WITH INTEGRAL LASER-SCANNER-CANTILEVER AND INDEPENDENT STATIONARY DETECTOR

RELATED APPLICATION

This application is a continuation in part of application Ser. No. 08/516,771, filed Aug. 18, 1995 abondoned.

BACKGROUND

1. Field of the Invention

This invention relates generally to scanning force microscopes, and more particularly to such a microscope with an independent stationary photodetector located away from a scanner, which allows the surface of samples to be imaged while the cantilever portion of the scanner is immersed in liquids without special set-up or special adapters.

2. Description of Prior Art

Scanning force microscopes (SFM), also known as atomic force microscopes (AFM), are useful for imaging objects as small as atoms. The scanning force microscope is closely related to the scanning tunneling microscope (STM) and the technique of stylus profilometry. However, in a typical scanning force microscope, deflection of a laser beam by a vertical movement of a probe following the contours of a specimen is amplified by a reflective lever arm to which the probe is mounted. The deflection of the laser beam is typically monitored by a photodetector in the optical path of the deflected laser beam, and the sample is mounted on a stage moveable in minute distances in three dimensions so that the sample can be raster scanned while the vertical positioning of the probe relative to the surface of the sample is maintained substantially constant by a feedback loop with the photodetector controlling the vertical positioning of the sample. Thus the SFM maps a spatially varying surface into an image.

The sample is mounted on piezo-ceramic transducers in such a way that the X-Y dimensions can be scanned as a raster and the Z dimension controlled through the feedback loop with the photodetector such that the tip maintains a constant force on the surface. Appropriate control electronics and computers are integral to the instrument and are used to control all movements and to acquire and display data.

The probe consists of a cantilever with a sharp tip located orthogonally on one end of the cantilever, in, or nearly in, contact with the surface to be profiled or otherwise examined.

The cantilever has such a small spring constant that typically less than one nanonewton of force will cause a noticeable deflection. The cantilever deflects due to natural forces present between the tip and the sample. The probe may be either attracted to the surface or repelled by the surface depending on the forces at work. When relative motion in the X and Y directions exists between the probe and the sample surface, the cantilever will bend as topographical features of the sample move under the tip.

Such scanning force microscopes are useful for imaging a sample which is moved in three dimensions by the scanning assembly moving the sample. However, this conventional design is only useful for samples which are comparatively small or which can be cut small enough from a larger specimen to be examined on the scanning stage of the microscope. Such samples typically must also weigh about a gram or less, in order to accommodate the relatively high scan rates without causing distortion due to resonance effects. Although previous designs for a free standing scanning force microscope include a scanning mechanism and sensor element for scanning large samples, they are difficult to operate and employ a sensor head force on a sample which prohibits use of the microscope for scanning many polymers and biological molecules without the use of special adapters or set-up, such as the use of sealed liquid cells.

It would, therefore, be desirable to provide a scanning force microscope with the capability of scanning a sample in contact with a fluid, without the preparation of special fluid cells or special adapters. This capability would be particularly useful in some applications, as such a fluid environment can significantly change scanning conditions and opportunities, and can improve the quality of the image of the sample developed by the instrument.

In conventional scanning force microscopes, a probe can be damaged by too abrupt an approach to a sample before feedback position control is actually engaged. The user typically can not easily view the approach of the lever arm and probe assembly to the surface of the sample to insure precise positioning of the probe. Even where an optical microscope is used in conjunction with the scanning force microscope to view the sample, the arrangement of the optical microscope with the scanning force microscope can be inconvenient and clumsy, and can interfere with the operation of the scanning force microscope. It would further be desirable to position X, Y, and Z scanning elements (e.g., piezo drives) in locations protected from abuse. The present invention meets these needs.

Existing SFM designs require that the operating characteristics of the tube pieces remain precisely the same. Present designs further suffer from the handicap that the cantilever is placed in precisely the same position at the end of the tube. Other existing designs are limited by the fact that the scanning head is entirely integral, not permitting scanners with different scan ranges to be used.

One common instrument design uses an optical lever arm to amplify the very small vertical motions as the contacting probe follows the contours of a surface. A sharp tip, located at the bottom end of a very small spring-board cantilever, is brought into contact with the surface to be scanned. The defection of the cantilever is monitored by a laser diode light beam which focuses onto the upper side of the end of the cantilever and reflects back onto a photodetector. Existing instruments using the optical lever arm design have several shortcomings from the user's point of view. Design simplicity, machine robustness and user friendliness are often short changed in existing designs.

Another SFM has been proposed, based upon the work of Jung and Yaniv (Elect. Ltrs. 29-3, 264–266 (1993)). This SFM obtains stationary sample stages with an optical-lever means, but uses different scanning means with correspondingly different piezo transducers. The scanning range is not limited by the size of the mirror deflecting the scanning beam, but can be extended further than previous designs until limited by the sensitivity of the piezo transducers.

Other designs require the sample to be physically attached to the scanner. Changing the scanner therefore requires the removal of the sample and reassembly of the SFM—a great inconvenience.

Another SFM has been introduced with a scanning mechanism and sensor element integrated into a package for scanning large samples. The SFM is based on the work of Hansma, et.al., (J. Appl. Phys. 76, 796–799 (1994)) and incorporates a means for tracking the beam from a stationary laser onto a cantilever located at the end of a piezo tube scanner. Tracking of the beam on the cantilever is accomplished by placing a lens within the piezo tube approximately mid-way such that as the tube scans, the laser beam remains focused on the cantilever. The deflected beam is collimated by a lens onto a stationary split detector for sensing the small deflections of the cantilever.

Such an arrangement operates in a rudimentary fashion, provided that the operating characteristics of the piezo tube remain precisely the same and provided that the cantilever is placed in precisely the same position at the end of the tube. Both of these constraints pose potential problems. The Hansma approach does solve the problem of relative motion between the focused spot on the specimen and cantilever. However, this design is limited in several ways. Some of these problems are alluded to in Hansma's paper (p.796). For example, alignment of the laser beam onto the cantilever is difficult, requiring the user of the machine to "pre-align" the cantilever onto a holder which is then carefully placed at the end of the tube scanner. Also, the piezo tube length must be relatively long (at least five centimeters) in order to obtain a large scan range of approximately 100×100 microns. This greater size in turn aggravates errors resulting from thermal drift effects. Such a long tube compromises the scanner's response to high frequencies, and lowers the resonant frequency, resulting in a limited scanning range. The piezo transducer scanner movement in the Z, or vertical, dimension is limited to about five microns only with this design. Such limited vertical movement means that the device's utility in practice is marginal. In addition, such a piezo tube requires high voltage or amps, which increase the cost and complexity of the electronics interface.

The Hansma approach also suffers from the fact that the scanning head is not entirely integral, not permitting scanners with different scan ranges to be used.

U.S. Pat. No. 5,157,251 refers to an SFM having a movable specimen holder housed in the base of the SFM and positioned relative to a probe housed in a sensor head. The specimen is monitored by an optical deflection detection system. This design, though, suffers from the drawback that only small specimens can be examined. Because the scanner is fixed while the specimen is moved, only specimens small enough to fit within the specimen holder can be scanned. Additionally, no liquid cells or specimens in liquid may be scanned because of the inability to seal the specimen in a fluid or gaseous environment.

U.S. Pat. No. 5,291,775 relates to an SFM which includes integrated optics for viewing the optical lever arm, probe and sample and incorporates an improved mount for the probe, which is magnetically secured to the stationary body of the SFM to improve the ease of handling. With this SFM the cantilever is stationary while the specimen is scanned. This design, however, does not allow the scanning of samples immersed in liquids without the use of special set-ups or adapters. Moreover, because the detector is an integral part of the scanning assembly, it requires that the cantilever be placed in exactly the same position at the end of the tube. Consequently, this design only allows the scanning of a relatively small specimen. In addition, the specimen is not easily viewed by the unaided eye when the SFM is in scanning position. Moreover, viewing of the specimen with an optical microscope is only permissible at a maximum of 45 degrees.

U.S. Pat. No. 5,319,960 describes a sensor module for SFM designs which uses integrated scanning drivers to allow the examination of varying sizes and weights of specimen. This module, however, does not address larger design drawbacks such as requiring the use of a fixed scanner. Similarly, the module does not ameliorate the difficulties associated with having the cantilever positioned in one fixed location at the end of the tube. Also, because the structure containing the laser, cantilever and detector is relatively large, the scan rate of the specimen in the X, or horizontal, and Y, or lateral, dimensions is severely limited owing to corresponding resonance effects. In addition, the design is somewhat delicate in operation. Inadvertent misuse can result in damage to the Z or vertical, piezo driver. As before, direct viewing of the specimen is not possible while the microscope is in the scanning position. Similarly, viewing of the specimen with an optical microscope is only possible up to a 45 degree angle. In addition, because the mechanical loop between the cantilever tip and the specimen surface is relatively great, errors resulting from thermal drift effects in the X, Y and Z dimensions are more likely.

U.S. Pat. No. 5,388,542 is directed to an SFM with a piezo-ceramic tube with means to allow the probe at its free end to move in the X, Y and Z directions. This design is substantially similar to the Hansma design and therefore does not address the disadvantages which afflict that design as discussed above. While the design may be conceptually appealing, in practice it may be difficult to maintain beam alignment with varying types and sizes of cantilevers. Typically, different cantilevers must be employed for different scanning modes and different types of microscopy.

U.S. Pat. No. 5,406,833 relates to an SFM with a "spring element" with a detecting tip whose displacement is determined by irradiating a laser beam onto the rear surface of the spring element and detecting the displacement using a multi-segmented photodetector. This complex design, however, suffers from multiple resonant frequencies resulting from the module's relatively great size. In addition, no top viewing is possible at a high angle, although viewing at approximately 45 degrees may be possible.

U.S. Pat. No. 5,408,094 similarly relates to an SFM which instead uses a cantilever with a detecting tip on the free end and a reflective surface on the rear of the tip. This design similarly is affected by multiple resonance frequencies caused by its relatively large structure. Greater disadvantage, though is that this SFM can operate with limited scan ranges. This occurs because of the difficulty in maintaining the light beam on the detector. Also, the design requires that the objective lens for viewing the sample is integral to the scanner, thus not allowing for change in magnification or for the use of specialized multiple lens optics that are typically incorporated into high quality microscopes. The integral "half-mirror" in the design further limits the quality of the viewing image.

SUMMARY OF THE INVENTION

The present invention provides an improved free standing type scanning force microscope with a separate photodetector located apart from the scanner for examination of an extremely wide range of sizes and weights of a stationary specimen, with the capability of scanning a sample in contact with a fluid, by means of a double-membrane liquid cell.

The invention accordingly provides a scanning force microscope for examining surface contours of a stationary specimen. The microscope preferably includes a main body having a base adapted to be positioned on a substrate for examination of the specimen, and scanning means with scanning drivers integrated into the microscope to scan a sensor probe of the microscope in three dimensions or degrees of freedom relative to the stationary specimen. While the present invention uses piezo drivers each of which is comprised of integrally-formed stacked piezo elements, other types of piezos, including piezo tubes could be used. The scanning means is secured to the main body by a scanner pivot secured to the main body. The scanning means therefore moves in two degrees of freedom relative to the scanner pivot.

A light source means, preferably a laser, is also provided in the main body of the microscope to produce a focused light beam directed at and deflected by the optical lever arm onto a photodetector means. A mirror is preferably used to deflect the light beam from the light source means onto the optical lever arm means. Use of a mirror allows the SFM to be more compact, but is otherwise not needed.

A sensing means refers to the means by which a particular surface property is detected during scanning, which includes a probe at or near the surface that limits the area in which the property will be measured. The sensing means also includes, at a minimum, a transducing element which converts the relative magnitude of the property into an electrical signal which can be further manipulated or recorded. Sensing means other than the typical use of cantilever sensing elements are those exploiting the reflecting of light from other reflecting elements, the piezoelectric effect, the piezoresistive effect, use of resonating elements such as the amplitude and frequency shifts indicative of the probe's interaction with the surface properties of the specimen, photodiode and photoelectric effects.

The optical lever arm preferably includes a reflective cantilever having a free end to which the probe tip is mounted. The sensor probe means preferably is controlled by integrated piezo drivers in the microscope to contact and follow the surface contours of the specimen with a substantially constant amount of force. The optical lever arm means preferably includes a reflective surface means mounted within the body to deflect the light beam from the optical lever arm means to the photodetector.

Photodetector means are provided separate and apart from the main body of the microscope to receive the deflected light beam and to produce an output signal indicative of the degree of deflection of the light beam by the optical lever arm means. Control means are also provided for maintaining an approximately constant force of the probe against the surface contours or interactive forces of the specimen.

The double membrane liquid cell preferably provides a glass window through which the laser light can enter, be deflected from the cantilever, and exit upwards through the window to the photodetector. The window also allows direct viewing of the specimen. The specimen may be imaged while immersed in liquid within the cell. The liquid is contained by means of a deformable membrane or spacer. In this preferred embodiment of the microscope, the surface of specimens can be imaged while the cantilever portion of the scanner is immersed in liquids without the need for prior special adjustment configurations or devices. Means for viewing the optical lever arm, probe means, and an adjacent specimen may also be provided.

Accordingly, in addition to the objects and advantages of the SFM with integral laser—scanner—cantilever and independent stationary photodetector described above, several objects and advantages of the current invention are:

1) the sensing means (light source, optical lever arm, probe and photodetector) and scanning elements (piezo drivers) are located above a stationary sample of any size. The design incorporates two sets of X, Y and Z piezo drivers, such that the area scanned can range from a few nanometers to 100 microns square. The vertical resolution allows imaging of atoms as well as contours of several microns.

2) minimizing moving parts related to the scanner, particularly, a) simplified mounting of laser and related adjustments and b) locating the detector off the scanner.

3) positioning X, Y, and Z piezo drivers in locations protected from abuse.

4) providing convenient locations for adjustments and capability for viewing the sample and cantilever with high quality optics.

5) the surface of samples may be imaged while the cantilever portion of the scanner is immersed in liquids without special set-up or special adapters because of viewing at a high angle, such as the use of sealed liquid cells. This is a major enhancement, as scanning biological samples under physiological conditions represents a major market need.

6) the current invention is easier to use than existing designs because the SFM incorporates a stationary detector but allows for the scanner to be changed.

Further objects and advantages are provided by two other design advantages which facilitate the microscope's ease-of-use:

7) because of the short pivot length, a standard high quality optical microscope, placed at approximately 10 degrees from vertical and adjacent to the scanner pivot, can be used to observe the cantilever and sample during adjustments and while scanning. This is a very important feature for users who first scan large areas optically and then need to use a scanning probe microscope (SPM) to visualize smaller regions of interest.

8) the straddled superstructure in the immediate vicinity of the cantilever is minimal, allowing for excellent direct view of the cantilever and sample, as well as the capability for modifying the scanner for viewing the sensing means for other types of SPM including SFM in either contact, intermittent-contact, or non-contact modes, scanning tunneling microscopy, electrochemistry AFM and STM, near-field scanning optical microscopy, scanning thermal microscopy, scanning magnetic force microscopy, scanning electrostatic microscopy, and related techniques. With the use of an optical microscope the sample may be viewed at an angle of 90 degrees from the scanner pivot.

These and other objects and advantages of the invention will become apparent from the following detailed description, and the accompanying drawings, which illustrate by way of example the features of the invention.

DETAILED DESCRIPTION OF PREFERRED EMBODIMENTS

Figure 1:
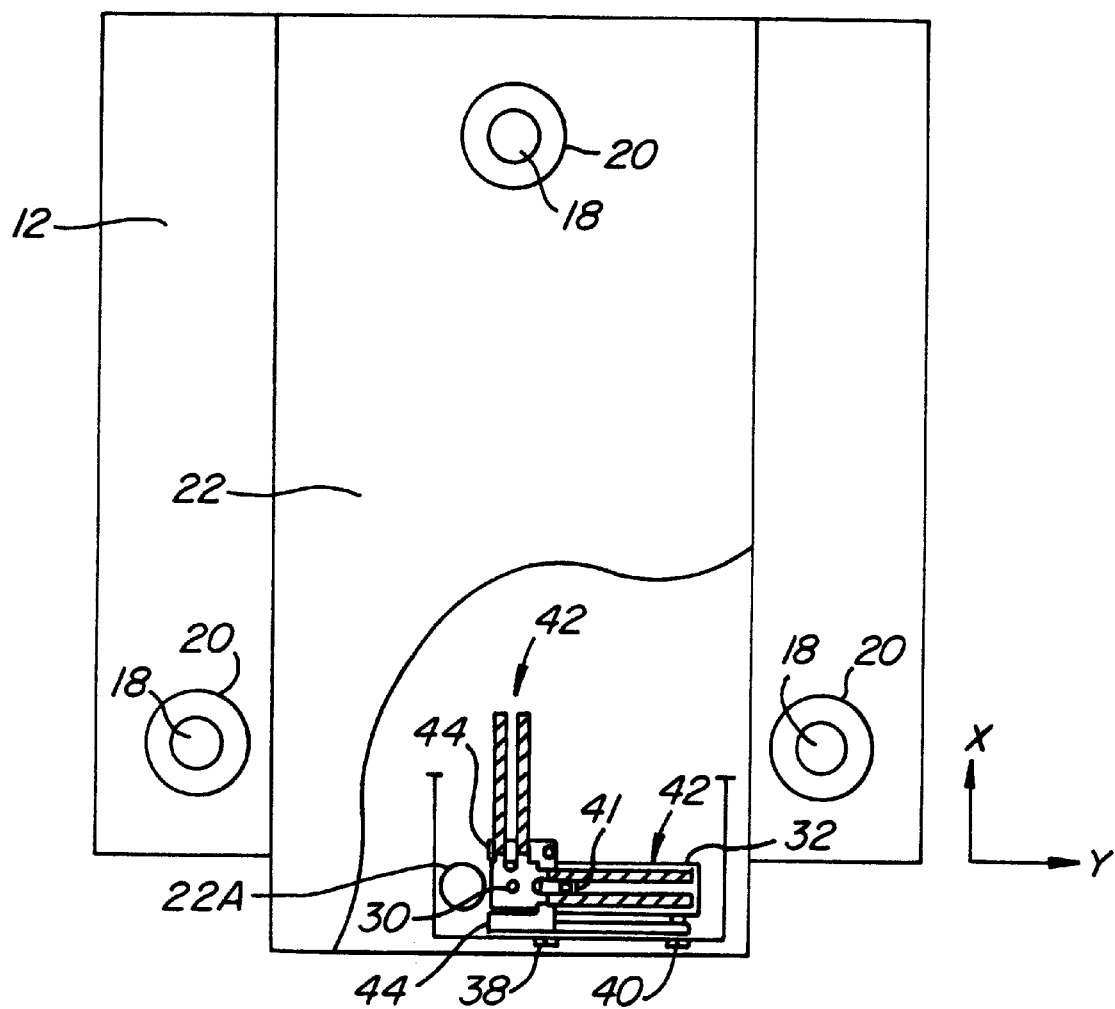
FIG. 1 is top view displaying the straddled superstructure of the invention, which is applicable not only to scanning force microscopy, but to other related arts as well. For reference, the X and Y motions of the cantilever probe are marked. The Z motion is into and out of the paper.
Figure 2:
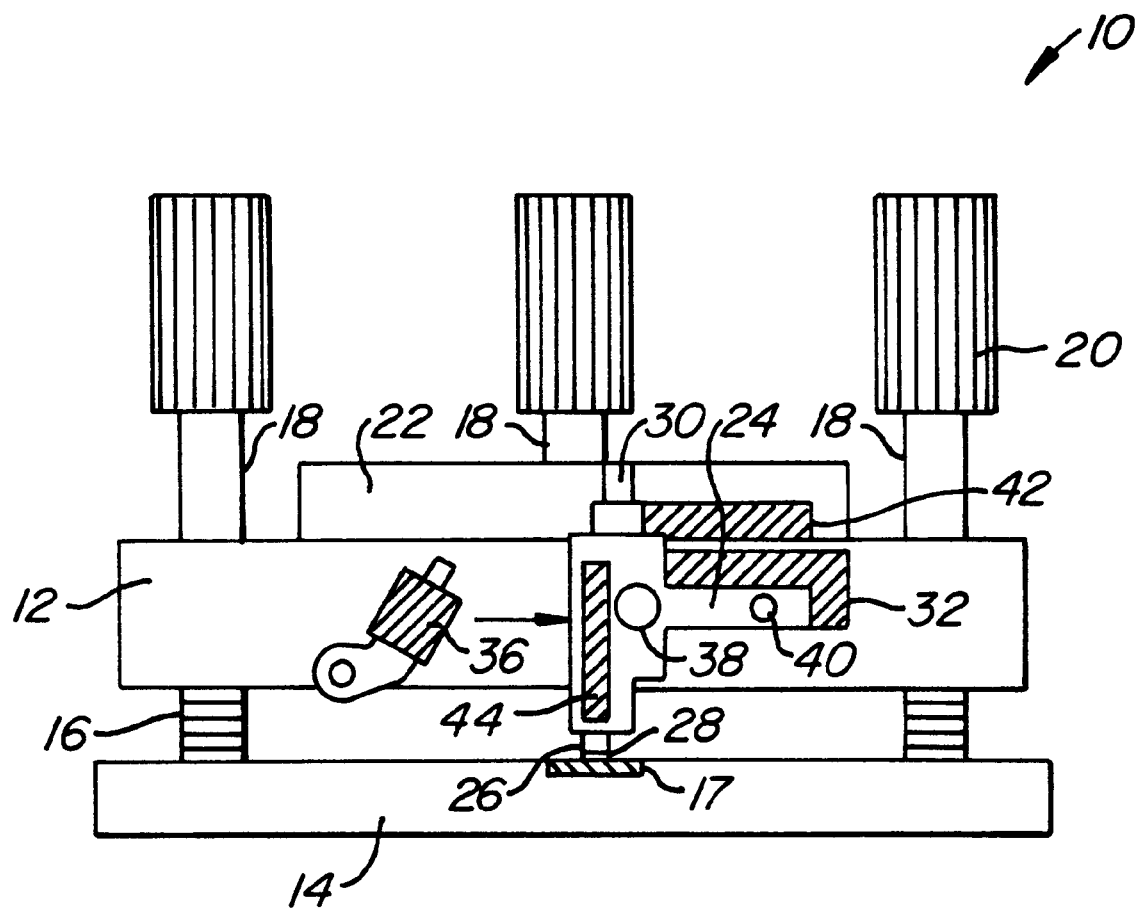
FIG. 2 is a side view perspective illustrating the spatial relationships of major elements of the scanning force microscope of the invention.

As is illustrated in the drawings, the invention is embodied in an improved free standing type scanning force microscope 10 having a main body 12 which rests upon a lower base 14 by moveable support means including screws or bolts 16, with adjustable motor driven supports 18 for supporting the body 12 of the microscope on a substrate and moving the body 12 of the microscope in a vertical dimension relative to a specimen 17 mounted with respect to the substrate. Each of the motor driven supports 18 includes a screw drive motor 20 connected to a control unit (not shown), which coordinates the operation of the supports 18 in response to position signals from the optically encoded screw drive motors 20, so that the motors 20 operate in unison to raise and lower the microscope uniformly. The specimen 17 to be examined can consist of a portion of the substrate, and can therefore in principle be of any size or weight.

The lower base 14 of the microscope typically has the general shape of a rectangular block, and supports the specimen 17, the body 12 and the upper base 22. The motorized adjustable supports 18 of the lower base 14 are preferably three in number, arranged in a tripod, although other numbers of supports 18 may also be possible. The length of extension of the supports 18 from the lower base 14 is preferably adjustable by screw drive motors 20 to which the supports 18 are mounted, with the supports 18 extending through bores to support the upper base 22. The rectangular block of the upper base 22 may also include a bore 22A for an objective lens or charge couple device extending through the block and focusing on the immediate vicinity of the probe tip 26 of the cantilever 28 and surface of the specimen 17. A second bore may also be provided through the base to allow illumination for optically viewing the approach of the lower scanner 48 to the specimen 17. A sensing means is preferably mounted to the under side of the upper base 22. This attachment is provided by the X-Y pivot 30 which supports the scanning means below.

Scanning means 46 includes all elements below the X-Y pivot 30 including, at a minimum, the sensing means, movable supports including piezo drivers 42, 44, straddled support structure 24 which is suspended under the X-Y pivot 30, and light source means 32. The X-Y piezo drivers 42 move the straddled support structure 24 about the pivot 30 and the Z piezo drivers 44 are suspended within each of the arms of the support structure 24. The sensing means is attached and suspended from the lower ends of the Z piezo drivers 44 and, in this particular case, includes a lower scanner 48 which is attached to the lower ends of the Z piezo drivers 44 and supports the reflective cantilever arm 28 formed in the shape of a triangle from first and second arms secured at one end to the free end of the integral cantilever support member and joined together at their free ends.

The arms of the cantilever 28 are typically about 10–30 microns wide, about 100–200 microns long, about 0.5–5 microns thick, and are secured to the integral cantilever support member about 50–100 microns apart. Although the silicon nitride material from which the cantilever 28 is made is normally considered quite rigid, with these dimensions the cantilever bows and flexes as much as 20 degrees in response to the force of the probe tip 26 against the specimen 17, amplifying the deflection of the light beam, as is explained further below. The reflective cantilever 28 is so small that it may be etched from silicon nitride, although other materials may also be used, such as silicon which can lend themselves to etching, fine machining, or other such processes familiar to those skilled in the art of manufacturing integrated circuit chips, and which can provide a reflective surface. Attached to the free end of the cantilever 28 is a probe means including a distal needle-like probe tip 26 adapted to contact and follow the surface contours of the specimen 17.

A light source means 32, such as a laser diode with associated optics, is mounted in the upper portion of the body 12 for producing a focused light beam directed at and reflected by the reflective cantilever 28. One preferred laser diode, which is commercially available, is a three milliwatt laser diode which produces a beam in the 670 nm range. An opening is provided in the straddled superstructure 24 to allow the light beam to pass through to the cantilever 28. A reflective means such as the planar mirror 34 is preferably mounted in the interior of the straddled superstructure 24 at a distal end of an adjustment screw through threaded access port to reflect the beam to the cantilever 28 and onwards to a photodetector 36 independently mounted in a photodetector body for receiving the deflected light beam. The planar mirror 34 can be pivoted by means of an adjustment mechanism 38 which is a simple screw-pivot such that the beam moves along the Y dimension. The light source means 32 can also be adjusted by means of a second pivot 41 to move the light source means 32 in the X or horizontal direction using adjustment screw 40.

The photodetector 36 preferably generates an electrical output signal in response to the deflected light beam indicative of the degree of deflection of the light beam from the straddled support structure 24, and for generating the error signal indicative of a variance from the interaction forces between the probe 26 and the specimen's 17 surface. The photodetector 36 is mounted to receive the deflected light beam in a second body independent from the integral scanner/laser unit in which the stationary photodetector 36 is positioned at the light beam's tangent to the arc that is swept about the main pivot 30 in the Y-Z plane by the scanning means 46. The photodetector 36 is typically formed as an array of four photosensors, in which the top pair is coupled to provide a combined signal, and the bottom pair is coupled to provide a combined signal. The deflected light beam is typically targeted at a central point between the top and bottom portions of the photodetector 36, and the combined signals from these portions are processed to generate output signals which can be compared to produce a differential error signal by control means.

The mechanism for raster scanning the specimen 17 preferably includes a multiplicity of stacked piezo drivers 42 disposed in the scanning means 46 oriented horizontally at right angles to each other for X and Y raster scanning movements. A ten-to-one gain is achieved from the movement of the probe tip 26 relative to the X-Y direction piezo drivers 42. The scanning means 46 in the vertical or Z dimension is controlled by a multiplicity of stacked piezo drivers 44 mounted vertically in a holder preferably made of aluminum, or Invar if thermal expansion effects are to be minimized. The piezo drivers 42, 44 are mounted to the upper end of the scanning means 46, to provide for X, Y, and Z motion of the lower scanner 48. At the cantilever 28, the motion achievable with the piezo drivers 42, 44 typically ranges approximately from 0 to 20 microns in the vertical or Z direction, and approximately from 0 to 100 microns in the horizontal or X and Y dimensions. Depending upon the electronics circuitry which operates the piezo drivers it is possible to achieve motions with an atomic resolution as small as approximately 0.02 nanometers in the vertical dimension, and approximately 0.03 nanometers in the horizontal dimensions.

The scanning means 46 preferably also includes feedback control means for driving the piezo drivers 44 in the vertical dimension as the probe tip 26 traverses the contours of the specimen 17, to maintain substantially constant interaction forces between the probe and the specimen 17. The control means preferably comprises microprocessor means (not shown) electrically connected to the photodetector 36 by line to receive the output signals indicative of deflection of the light beam from the straddled support structure 24, and for generating the error signal indicative of a variance from the interactive forces between the probe tip 26 and the specimen 17 surface. The control means is electrically connected to the piezo drivers 42, 44 by control lines for raising and lowering the sensing means 46 with respect to the specimen 17 for raising or lowering the force of the probe tip 26 against the specimen 17 surface to maintain the substantially constant interaction of the probe tip 26 against the specimen 17 surface, and for raster scanning the specimen 17 in a horizontal plane in X and Y directions. The optically encoded screw drive motors 20 of the motor driven supports 18 are also connected to the control means by control lines enabling the control means to receive the optically encoded position signals from the drive motors 20 and to uniformly coordinate the operation of the drive motors 20 in raising and lowering the microscope 10.

Figure 5:
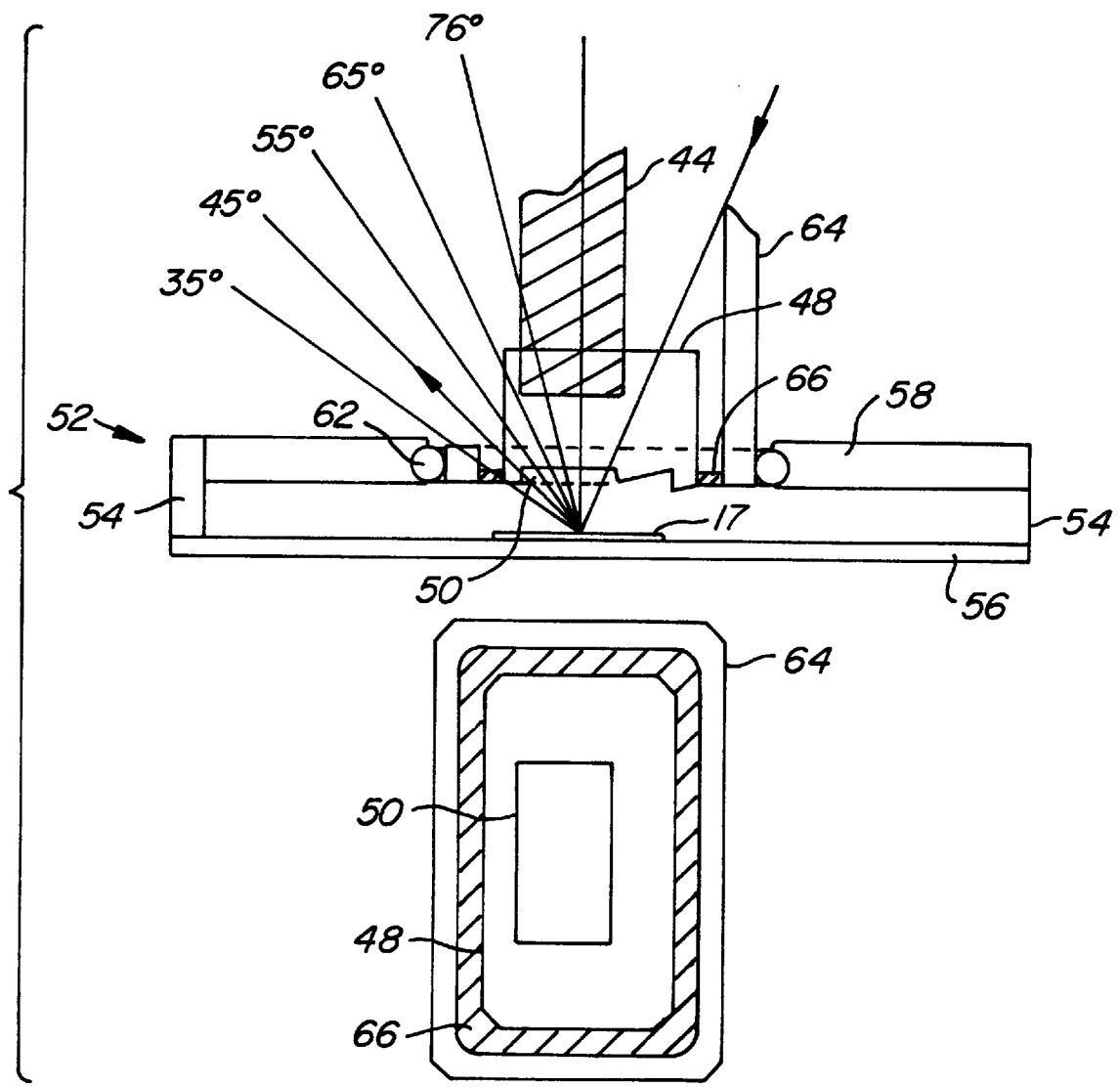
FIG. 5 is a side view illustrating the spatial relationships of major elements of the double membrane liquid cell.

In one alternate preferred embodiment, illustrated in FIG. 5, the lower scanner 48 is fitted with an end piece or cap having a middle viewing tube secured to the cap at an upper end of the viewing tube and extending downwardly. The viewing tube is sealed at its lower end by a window 50 such as a thin pane of glass, to allow the lower end of the scanning means 46 to be placed in a liquid. The lower portion 48 of the scanning means 46 mates into the center of a double membraned liquid cell 52. The cell 52 has container means for containing either liquid or gas comprising solid sides 54, a solid bottom 56 and semi-open top 58. The specimen 17 is placed upon a substrate 60 seated on the bottom 56 of the cell 52, centrally located directly beneath the window 50. Attached to either side of the semi-open top 58 are O-ring seals 62, which are themselves attached to rigid supports 64. The rigid supports 64 connect vertically to the body 12. The lowermost tip of these vertical supports 64 are laterally connected to a deformable membrane or spacer 66, which directly abuts the lower scanner 48 on either side. The liquid is therefore contained by the solid bottom 56, solid sides 54, semi-open top 58, O-ring seals 62, rigid supports 64, deformable membrane or spacers 66 and lower scanner 48.

The sensing means preferably consists of a probe tip 26 extending from the underside of the cantilever 28, to be placed near or in contact with a specimen 17, preferably mounted on a substrate 60 in a liquid environment. The remainder of the structure of the scanning force microscope 10 in this alternate embodiment is substantially identical to that of the previous embodiment. The lower scanner 48 can thus be submerged in the liquid environment for scanning of the stationary specimen 17 without special set-ups or adapters.

It has therefore been demonstrated that the scanning force microscope of the invention provides for an improved mount for the probe of the microscope, which is easier to handle and install in the microscope. The integrated optics of the microscope permit the user to view the approach of the lever arm and probe assembly to the surface of the specimen 17 to insure safe and precise positioning of the probe near the specimen 17. The scanning force microscope also includes the capability of scanning a specimen 17 in a fluid environment, which can significantly improve the quality of the image of the specimen 17 produced by the instrument.

In FIG. 1, the plane of the drawing is the X-Y plane. Here, structure that is useful not only for a SFM, but also for other types of SPM including SFM in either contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy and related techniques. The salient feature of this design is that within the scanning means 46 there are movable vertical structures which support and straddle the sensing means, including the probe. These are preferably a multiplicity of piezo transducer drivers 42 providing horizontal (X axis) and lateral (Y axis) movement to ensure rigidity, and with a multiplicity of piezo transducer drivers 44 to allow vertical (Z axis) movement of the structure relative to the specimen 17.

In operation, the independently mounted photodetector 36, can be moved horizontally and vertically, in the X and Z dimensions with respect to the specimen 17. The three adjustable motor driven supports 18 of the scanning means 46 are also capable of simultaneous movement in the vertical dimension to facilitate the use of different scanner sizes. The scanning means 46 also incorporates horizontal (i.e., X, Y dimensions), and vertical (i.e., Z dimension) piezo drivers 42, 44 to allow raster scanning of the specimen 17.

Figure 3A:
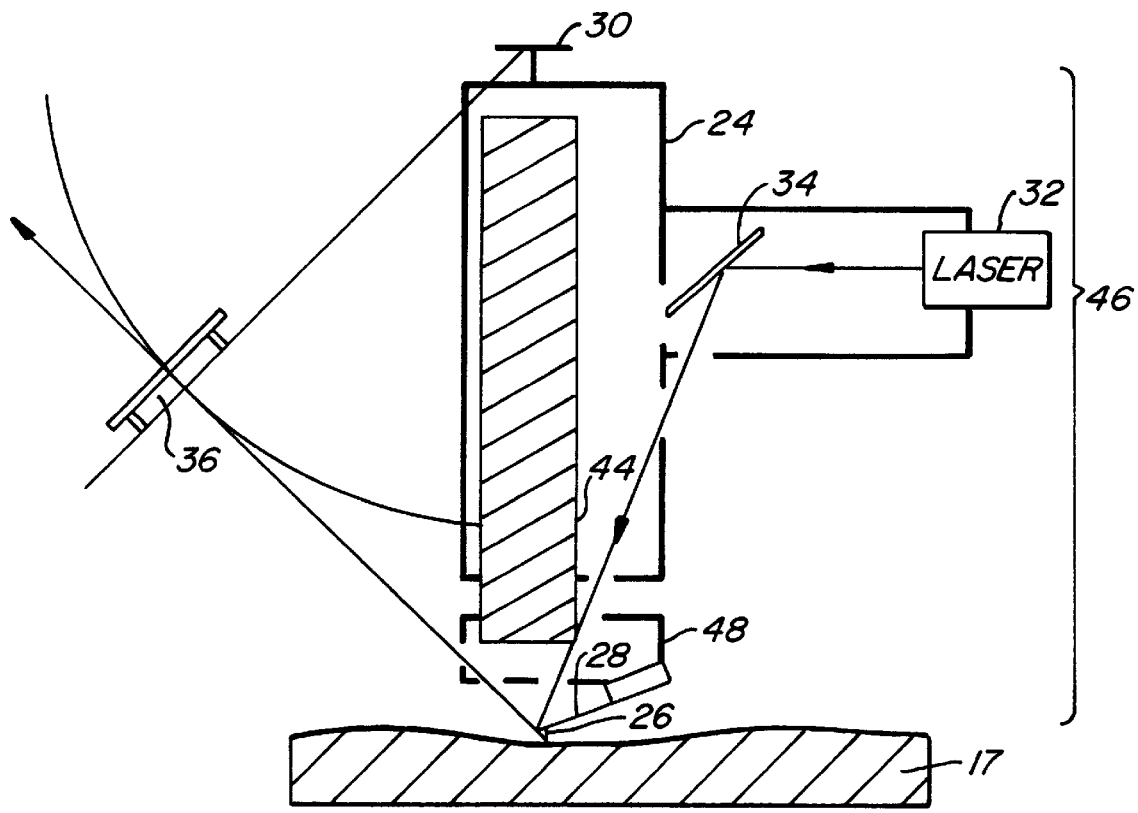
FIGS. 3a and b views illustrating the light beam path.
Figure 3B:
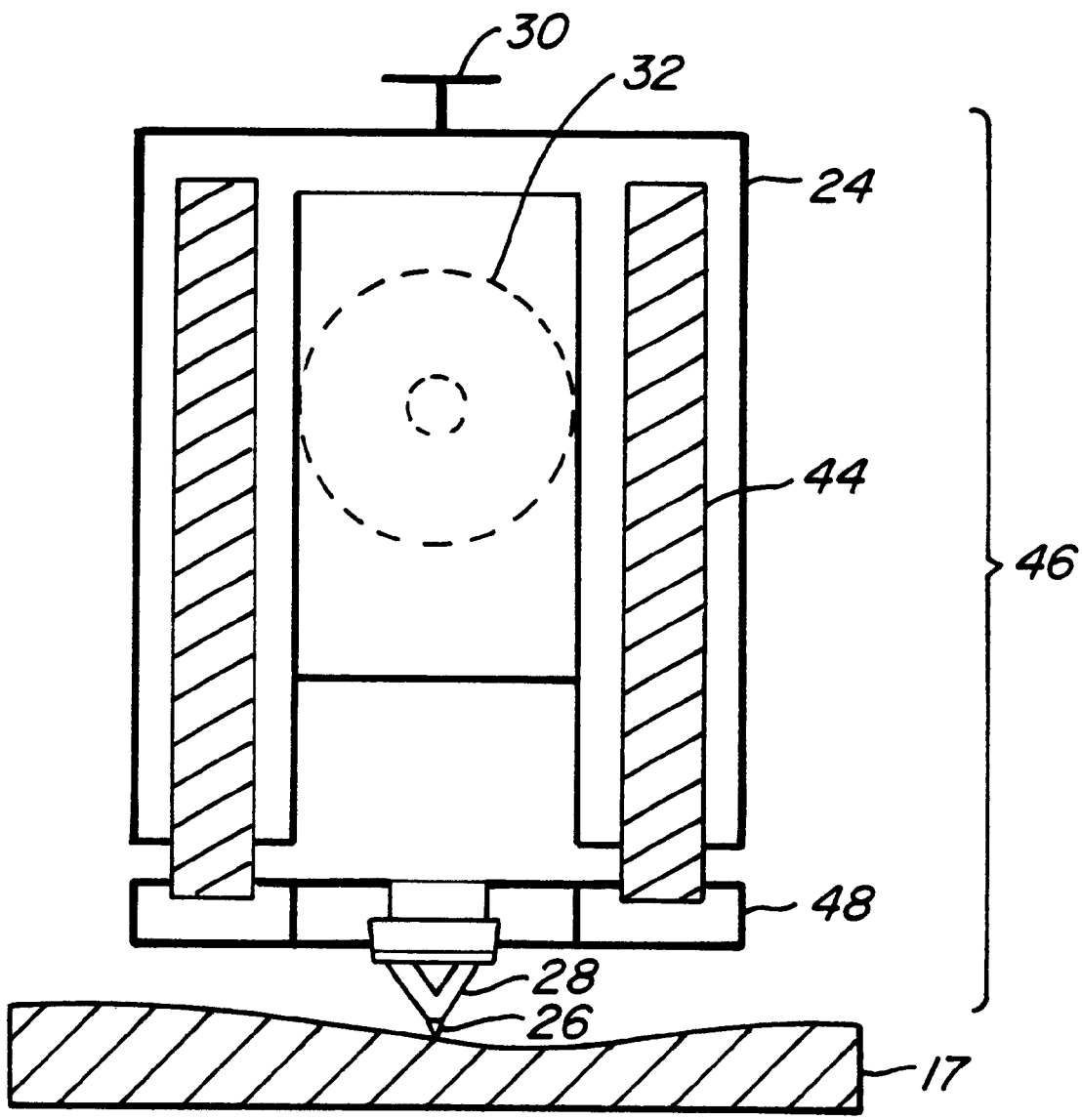

In FIG. 3a and FIG. 3b, the light beam path is depicted in operation. The light source means 32 operates on the same pivot 30 as the cantilever 28, ensuring that the light beam always remains focused upon the tip 26 of the cantilever 28. The light beam emanating from the laser light source means 32 is reflected by the planar mirror 34 onto the reflective surface of the probe tip 26 of the cantilever 28. The light source means 32 is integral with the pivoting X-Y scanning means 46 such that the beam always focuses onto the end of the cantilever 28. The beam is then deflected from the probe tip 26 to the photodetector 36.

The plane of the split photodetector 36 is positioned along the deflected beam at a particular distance from the cantilever 28. The optimal position of the photodetector 36 is located at the beam's tangent to the arc that is swept about the pivot 30 of the scanning means 46. There is a small error, as the deflected beam does move slightly as the scanning means 46 sweeps in an X-Y fashion. The maximum error at the "waist" of the beam has been calculated to be less than a few hundred angstroms equivalent of Z distance. In practice, the error seems to be less than that calculated.

Figure 4:
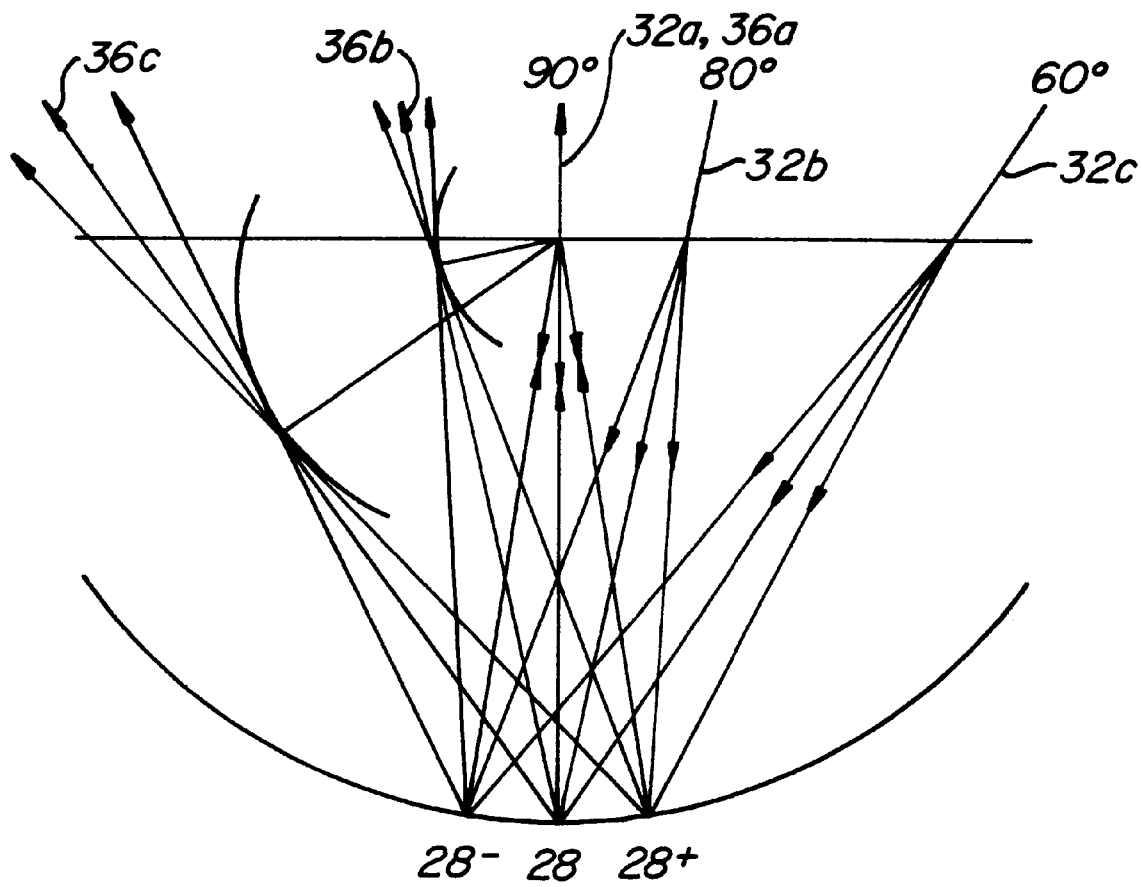
FIG. 4 is a side view showing the optimal detector location at three different angles of the light source means of the scanning force microscope of the invention.

In FIG. 4, the optimal photodetector 36 is depicted in locations for three arbitrary light source 32 locations. The plane of the drawing is the Y-Z plane (i.e. the plane in which the topography of the surface is monitored by the deflection of the cantilever 28). Illustrated are the entrance angles onto the cantilever 28 are 90, 80 and 60 degrees. The source 32 location in terms of elevation is not material; the same elevation has been chosen for simplicity of illustration. Also for an example, the cantilever 28 angle is set to zero degrees. The light source means 32 moves on the same pivot 30 as the cantilever 28 and, therefore, is always directed onto the cantilever 28.

The three cantilever 28 locations represent the limits of sweep (including midpoint) about the pivot 30. This drawing is an exaggeration of the actual scanning means 46 motion, in which the sweep is +/−50 microns above the specimen 17 and the pivot-cantilever distance is one inch.

The optimal photodetector 36 location is along the reflected beam at the "waist" of the apparent intersection of the three reflected beams. The beams do not truly intersect as the precise locations of the tangents to the arc about the pivot 30 point are slightly different. These optimal locations hold for both the X and Y scan directions in the plane of the specimen 17.

The ideal situation is for the photodetector 36 to be located at the same elevation in Z, (i.e., located at the pivot 30) as the source 32. However, in the actual design, some compromises must be made in order to accommodate the actual mechanical components. Indeed, the more important direction is in the Y-Z plane because it is desirable to minimize the movement of the reflected beam onto the split photodetector 36 caused by the pivot-sweep effect. The X-Z plane is used to monitor torsional effects on the cantilever 28, and these background effects can be more easily corrected mathematically. Therefore, the preferred arrangement is to locate the photodetector 36 at the same elevation in z as the light beam's tangent to the arc about pivot 30. In addition, the photodetector 36 is mounted in such a fashion as to allow it to be moved horizontally (along the X axis) in order to locate the photodetector 36 onto the optical path.

In FIG. 5, the plane of the drawing is the Y-Z plane. For illustrative purposes, an entrance beam at 65 degrees and resulting exit beam at 45 degrees are displayed. Also for illustration, the cantilever 28 angle is set to 10 degrees. In addition, a viewing angle of 76 degrees has been chosen for illustrative purposes only.

The specimen 17 is seated upon the bottom 56 of the cell 52, which is filled with liquid. The liquid is contained by means of deformable membranes or spacers 66. The light beam is deflected from the mirror 34 through the viewing window 50 onto the cantilever 28, where it is deflected back up through the viewing window 50 and onto the stationary photodetector 36.

Accordingly, it is apparent that the cantilever portion of the scanning means can be immersed in liquid to facilitate the scanning of biological specimens under physiological conditions, without the need for special adjustments or devices such as sealed liquid cells. In addition, because the pivot length is short, a standard high quality microscope may be placed at about ten degrees from vertical and adjacent to the scanner pivot in order to observe the specimen while making adjustments and during scanning. Furthermore, the invention has the additional advantages in that:

specimens of any size may be viewed without causing distortion due to resonance effects from high scan rates the laser can be mounted and adjusted more easily the number of moving parts in the scanner is minimized the X, Y, and Z piezo drivers are protected from accidental damage convenient locations for making adjustments necessary for viewing the specimen are provided different scanners may be used despite the stationary detector.

It will be apparent from the foregoing that while particular forms of the invention have been illustrated and described, various modifications can be made without departing from the spirit and scope of the invention. Accordingly, it is not intended that the invention be limited, except as by the appended claims and their legal equivalents, rather than by the examples given.

What is claimed is:

1. A structure for examining surface contours of a specimen by scanning probe microscopy including scanning force microscopy in either contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy and related techniques, comprising:

a main body;

scanning means mounted adjacent to the main body and movable in three degrees of freedom for scanning the specimen in two degrees of freedom in at least one specimen plane within which the specimen can be positioned;

the scanning means including a straddled support structure pivoted about the main body; a sensing means for sensing surface contours of the specimen; and a pair of movable supports positioned within the straddled support structure and straddling the sensing means, the movable supports being coupled to the straddled support structure and to the sensing means for moving the sensing means in a vertical direction oriented substantially perpendicular to the specimen plane.

2. The structure of claim 1, wherein the movable supports comprise a spaced pair of Z-direction piezo drivers coupled to opposed sides of the straddled support structure and to the sensing means, the Z-direction piezo drivers straddling the sensing means.

3. The structure of claim 1, wherein the scanning means further comprises:

a light source means integral with the scanning means for generating an incident beam of light directed at the sensing means;

a photodetector means movably mounted to the main body and independent from the scanning means for receiving the deflected light beam deflected by the sensing means and generating an output signal indicative of a degree of deflection of the deflected light beam by the sensing means; and a feedback control means electrically coupled to the photodetector and to the movable supports for driving the movable supports in the vertical direction as the sensing means traverses surface contours of the specimen to maintain substantially constant interaction forces between the sensing means and the specimen.

4. The structure of claim 3, further comprising:

a lower base;

a plurality of adjustable supports coupled relative to the lower base and the main body, the adjustable supports being synchronized together to position the lower base in a desired orientation relative to the main body, the adjustable supports being electrically coupled to the control means, with the control means operating the adjustable supports to automatically position the scanning means relative to the lower base.

5. The structure of claim 1, further comprising viewing means secured relative to the main body for viewing a specimen from above and immediately adjacent to the scanner pivot.

6. The structure of claim 5, wherein the viewing means comprises a bore extending through the main body and directed at the sensing means.

7. The structure of claim 6, wherein the viewing means comprises an objective optical lens focused on the sensing means.

8. The structure of claim 1, where the scanning means further comprises a plurality X-direction drivers couple to the main body, the X-direction drivers being coupled to opposed sides of the support structure, and a plurality of Y-direction drivers coupled relative to the main body, the Y-direction drivers being coupled to opposed sides of the support structure; wherein the X-direction drivers are oriented perpendicular relative to the Y-direction drivers.

9. A structure for examining surface contours of a specimen by scanning probe microscopy including scanning force microscopy in either contact, intermittent-contact or non-contact modes, scanning tunneling microscopy, electro-chemistry AFM and STM, near-field scanning optical microscopy, scanning thermal microscopy, scanning magnetic force microscopy, scanning electrostatic microscopy and related techniques, comprising:

a main body;

scanning means mounted adjacent to the main body and movable in three degrees of freedom for scanning the specimen in two degrees of freedom in at least one specimen plane within which the specimen can be positioned;

the scanning means including a scanner pivot movably coupled to the main body; a support structure coupled to the scanner pivot; a sensing means for sensing surface contours of the specimen; a light source mean integral with the scanning means for generating an incident beam of light directed at the sensing means; and a photodetector means movably mounted to the main body and independent from the scanning means for receiving a deflected light beam deflected by the sensing means and generating an output indicative of a degree of deflection of the deflected light beam by the sensing means;

wherein the photodetector means is aligned approximately perpendicular to a tangent plane of an are swept about the scanner pivot.

10. The structure of claim 9, wherein the photodetector means is mounted within a plane oriented approximately perpendicular relative to the deflected light beam at an intersection of the deflected light beam and the arc.

11. The structure of claim 9, wherein the photodetector means is movably mounted in one degree of freedom along a horizontal axis oriented substantially parallel to the specimen plane.

12. A structure for examining surface contours of a specimen by scanning probe microscopy including scanning force microscopy in either contact, intermittent-contact or non-contact modes, scanning tunneling microscopy, electro-chemistry AFM and STM, near-field scanning optical microscopy, scanning thermal microscopy, scanning magnetic force microscopy, scanning electrostatic microscopy and related techniques, comprising:

a main body;

scanning means mounted adjacent to the main body and movable in three degrees of freedom for scanning the specimen in two degrees of freedom in at least one specimen plane within which the specimen can be positioned;

the scanning means including a sensing means for sensing surface contours of the specimen; a light source means integral with the scanning means for generating an incident beam of light directed at the sensing means; and a photodetector means movably mounted to the main body and independent from the scanning means for receiving a deflected light beam deflected by the sensing means and generating an output indicative of a degree of deflection of the deflected light beam by the sensing means;

a liquid cell means for sealing the specimen and at least a portion of the sensing means within liquids or gases and for permitting scanning movement of the sensing means relative to the liquid cell means and the specimen when the specimen is fixed relative to the liquid cell means.

13. The structure of claim 12, wherein the liquid cell means comprises:

container means for supporting and containing the specimen within liquid or gases, the container means having a partially open top through which at least a portion of the sensing means extends;

a window means mounted relative to the scanning means for viewing the specimen when positioned within the container means and for allowing the incident and deflected light beams to respectively enter and exit the container means;

sealing means laterally attached to the scanning means on one end and attached to the partially open top for sealing liquids or gases within the container means.

14. The structure of claim 13, wherein the sealing means comprises at least one seal abutted against a portion of the open top; at least one rigid support coupled to the main body and abutted against the seal; and at least one deformable membrane abutted against both the scanning means and the rigid support.

15. The structure of claim 13, wherein the window is mounted on the lower scanning means.

* * * * *